Aug. 23, 1949.  F. L. HUNTER  2,480,025
BED CARRIAGE
Filed Nov. 29, 1946  2 Sheets-Sheet 1
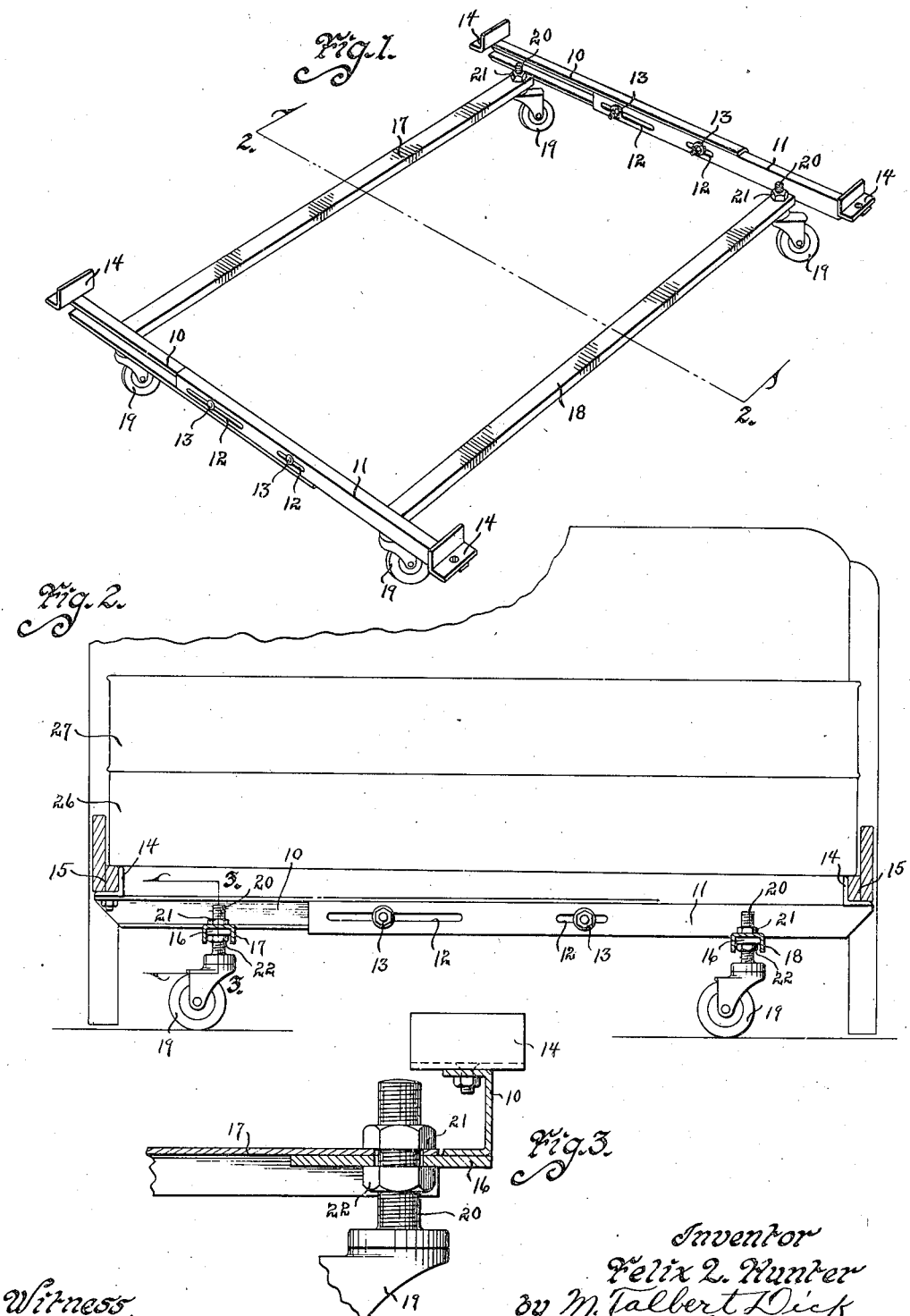

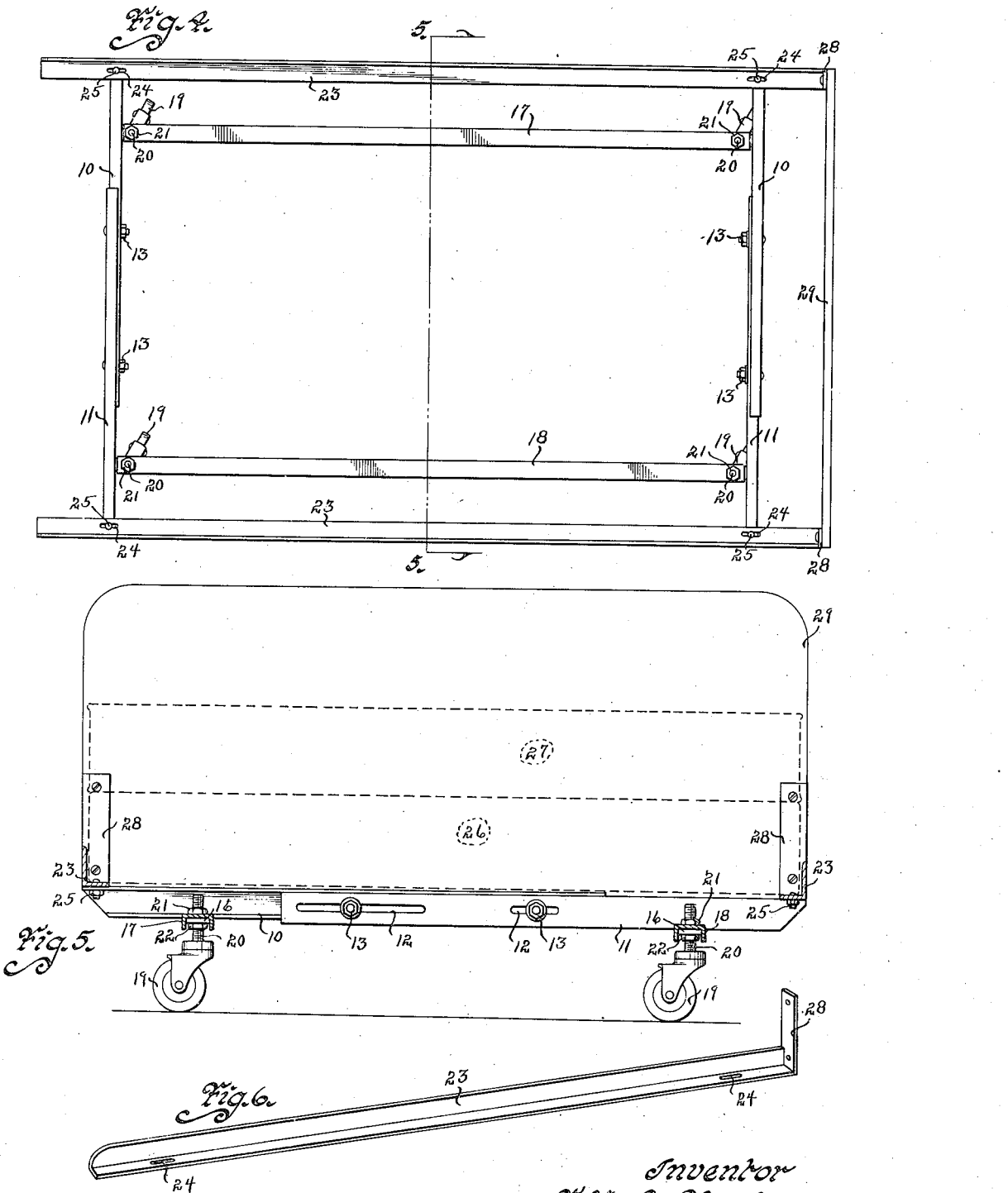

Patented Aug. 23, 1949

2,480,025

UNITED STATES PATENT OFFICE 2,480,025

BED CARRIAGE

Felix L. Hunter, Des Moines, Iowa

Application November 29, 1946, Serial No. 713,034

7 Claims. (Cl. 280—35)

The principal object of this invention is to provide a wheeled carriage capable of successfully supporting an entire bed, or if desired, merely supporting the springs and mattress of a bed.

A further object of this invention is to provide a wheeled bed carriage that is not only capable of supporting the spring and mattress of a bed, but is also capable of supporting and holding a headboard for producing a bed of the "Hollywood" type.

A still further object of my invention is to provide a bed carriage that is easily and quickly adjustable for accommodating beds of different sizes.

A still further object of my invention is to provide an adjustable bed carriage that may be disassembled and placed in a relatively small package for shipment or storage purposes.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a perspective view of my carriage capable of supporting a bed or like.

Fig. 2 is a cross-sectional view of my carriage taken on line 2—2 of Fig. 1 and showing its method of supporting a bed.

Fig. 3 is an enlarged sectional view of a portion of my bed carriage taken on line 3—3 of Fig. 2 and more fully illustrate its construction.

Fig. 4 is a top plan view of my bed carriage with side supporting channels for use with box springs or like.

Fig. 5 is a cross-sectional view of my carriage taken on line 5—5 of Fig. 4 and supporting springs, a mattress, and a headboard.

Fig. 6 is a perspective view of one of the detachable side supporting channels.

The chief objections to ordinary beds are that they have relatively small caster wheels, are not adjustable as to size, and are extremely heavy and cumbersome. My device is designed to overcome such objections.

I will first describe the specific structure shown in Fig. 1 and Fig. 2. In this construction two end and two side frame portions are shown. Each end portion consists of two channel irons 10 and 11 facing each other and nested for sliding movement relative to each other, as shown in Fig. 1. Each of these members 10 and 11 has elongated longitudinal slots 12. The numeral 13 designates bolts extending through the slot openings in the members 10 and 11. When these bolts 13 are loosened the members 10 and 11 may be slid inwardly and toward each other or away from each other for adjustment purposes. After the members 10 and 11 have been adjusted to fit a given bed or like the bolts 13 are tightened. The numeral 14 designates an L-bracket secured on the outer end of each of the members 10 and 11. These brackets face upwardly and outwardly to engage and support the frame 15 of a bed, as shown in Fig. 2. On the under side of each of the members 10 is a welded bar 16. By this arrangement, there are two spaced apart horizontal bars 16 at each end of the carriage and these two pairs of spaced apart bars extend toward each other and are engaged by the inverted side channel frames 17 and 18. As the side channel frame 17 extends between and engages the two bars on the two members 10 and the side channel 18 extends between and engages the two bars of the two members 11, these two inverted side frame channels 17 and 18 will be spaced apart, as shown in Fig. 1. Four large type caster wheels 19 are used. Each of these casters has a threaded pintle 20 extending through a bar 16 and the end of either the member 17 or 18, as shown in Fig. 3. The numerals 21 and 22 designate two nuts on each of the pintles 20. When these two nuts are tightened toward each other they rigidly clamp one of the side frame ends to a bar 16, thereby not only rigidly securing the caster wheel to the bed, but rigidly securing that end of one of the side frames to one of the bars 16. By the pintle 20 of each of the casters being threaded the casters may be easily lowered or raised relatively to the frame, thereby making it not only possible to properly balance the carriage so that all four casters will successfully engage a supporting surface, but also to lower and raise the carriage as required by different beds in order that the legs of the bed will be clear of the supporting surface, as shown in Fig. 2.

In many cases it will be desirable to dispense with the bed frame 15 and merely use a spring and mattress on my bed carriage. When this is desired, the construction shown in Fig. 4 and Fig. 5 is recommended. In this construction the members 14 are eliminated and two side L-support frames 23 spaced apart and secured on the outer ends of the members 10 and 11, as shown in Fig. 4. The recommended securing means consists of slots 24 in the members 23 and bolts 25 extending through these slot openings and the end portions of the members 10 and 11. By this arrangement the side members 23 may be adjusted forwardly or backwardly on the carriage. The faces of the L-side supporting beams 23 extend inwardly and upwardly, as shown in the drawings, to receive a bed spring. If the center of the bed spring is not self-supporting slats may be placed between the two members 23 in the usual manner. In the drawings I have used the numeral 26 to designate a bed spring and the numeral 27 to designate a mattress. On the forward ends of the members 23 I have provided a vertical bar 28. These two bars may be used to hold and support the headboard 29 when it is desired to have a bed of the "Hollywood" type. The rear ends of the members 23 should be rounded, as shown in Fig. 6.

To disassemble my bed carriage for storage or shipment it is merely necessary to remove the four casters and the four bolts 25. If the headboard 29 is employed, this, of course, will have to be removed from the members 28. To adjust my carriage to fit various widths of springs, mattresses, or beds, it is merely necessary to loosen the bolts 13, adjust the sides of the carriage to the proper width and then retighten the bolts. This telescoping action of the two members that make up the front frame portion and the two members that make up the rear frame portion makes rapid adjustment possible. By using either elongated channel irons or elongated L-angle irons throughout the construction the device is most rigid. By inverting the elongated channel irons 17 and 18 in order that their ends will embrace the bar 16 the frame will be maintained at all times in a rigid rectangular arrangement.

Some changes may be made in the construction and arrangement of my improved bed carriage without departing from the real spirit and purpose of my invention, and it is my intention to cover by my claims any modified forms of structure or use of mechanical equivalents which may be reasonably included within their scope.

I claim:

1. In a device of the class described, a front frame portion comprising two telescoping members, a rearwardly extending bar on each of said members, a rear frame portion comprising two telescoping members, a forwardly extending bar on each of said last two mentioned members, an inverted elongated channel iron having one end embracing a bar on one of the members that comprise the front frame portion and its other end embracing the bar of one of the members comprising the rear frame portion, a second inverted elongated channel iron embracing the other bar of the other member comprising the front frame portion and its other end embracing the other bar of the other member comprising the rear frame portion, a means for holding each of the members comprising the front and rear frame portions from telescoping at times, and a means for detachably securing the ends of said inverted elongated channel irons to the bars they embrace.

2. In a device of the class described, a front frame portion comprising two telescoping members, a rearwardly extending bar on each of said members, a rear frame portion comprising two telescoping members, a forwardly extending bar on each of said last two mentioned members, an inverted elongated channel iron having one end embracing a bar on one of the members that comprise the front frame portion and its other end embracing the bar of one of the members comprising the rear frame portion, a second inverted elongated channel iron embracing the other bar of the other member comprising the front frame portion and its other end embracing the other bar of the other member comprising the rear frame portion, a means for holding each of the members comprising the front and rear frame portions from telescoping at times, a means for detachably securing the ends of said inverted elongated channel irons to the bars they embrace, and wheel members operatively secured to said elongated channel irons.

3. In a device of the class described, a front frame portion comprising two telescoping members, a rearwardly extending bar on each of said members, a rear frame portion comprising two telescoping members, a forwardly extending bar on each of said last two mentioned members, an inverted elongated channel iron having one end embracing a bar on one of the members that comprise the front frame portion and its other end embracing the bar of one of the members comprising the rear frame portion, a second inverted elongated channel iron embracing the other bar of the other member comprising the front frame portion and its other end embracing the other bar of the other member comprising the rear frame portion, a means for holding each of the members comprising the front and rear frame portions from telescoping at times, a means for detachably securing the ends of said inverted elongated channel irons to the bars they embrace, wheel members operatively secured to said inverted elongated channel irons, and supporting members engaging the outer end portions of said front and rear frame portions.

4. In a device of the class described, a front frame portion comprising two telescoping members, a rearwardly extending bar on each of said members, a rear frame portion comprising two telescoping members, a forwardly extending bar on each of said last two mentioned members, an inverted elongated channel iron having one end embracing a bar on one of the members that comprise the front frame portion and its other end embracing the bar of one of the members comprising the rear frame portion, a second inverted elongated channel iron embracing the other bar of the other member comprising the front frame portion and its other end embracing the other bar of the other member comprising the rear frame portion, a means for holding each of the members comprising the front and rear frame portions from telescoping at times, a means for securing the ends of said inverted elongated channel irons to the bars they embrace, wheel members operatively secured to said inverted elongated channel irons, an elongated L-supporting beam secured at one end to said front frame portion and its other end secured to said rear frame portion, and a second L-supporting beam secured at one end to the front frame portion and its other end secured to said rear frame portion.

5. In a device of the class described, a front frame portion comprising two telescoping members, a rearwardly extending bar on each of said members, a rear frame portion comprising two telescoping members, a forwardly extending bar on each of said last two mentioned members, an inverted elongated channel iron having one end embracing a bar on one of the members that comprise the front frame portion and its other end embracing the bar of one of the members comprising the rear frame portion, a second inverted elongated channel iron embracing the other bar of the other member comprising the front frame portion and its other end embracing the other bar of the other member comprising the rear frame portion, a means for holding each of the members comprising the front and rear frame portions from telescoping at times, a means for securing the ends of said inverted elongated channel irons to the bars they embrace, wheel members operatively secured to said inverted elongated channel irons, an elongated L-supporting beam secured at one end to said front frame portion and its other end secured to said rear frame portion, a second L-supporting beam secured at one end to the front frame portion and its other end secured to said rear frame portion, and a vertical member on the forward end of each of said elongated L-supporting beams capable of supporting a headboard.

6. In a device of the class described, a front frame portion comprising two telescoping members, a rearwardly extending bar on each of said members, a rear frame portion comprising two telescoping members, a forwardly extending bar on each of said last two mentioned members, an inverted elongated channel iron having one end embracing a bar on one of the members that comprise the front frame portion and its other end embracing the bar of one of the members comprising the rear frame portion, a second inverted elongated channel iron embracing the other bar of the other member comprising the front frame portion and its other end embracing the other bar of the other member comprising the rear frame portion, a means for holding each of the members comprising the front and rear frame portions from telescoping at times, a threaded pintled caster extending through each of said bars and the elongated inverted channel iron adjacent to it, and two adjusting nuts on the threaded pintle of each of said casters.

7. In a device of the class described, a front frame portion comprising two telescoping members, a rearwardly extending bar on each of said members, a rear frame portion comprising two telescoping members, a forwardly extending bar on each of said last two mentioned members, an inverted elongated channel iron having one end embracing a bar on one of the members that comprise the front frame portion and its other end embracing the bar of one of the members comprising the rear frame portion, a second inverted elongated channel iron embracing the other bar of the other member comprising the front frame portion and its other end embracing the other bar of the other member comprising the rear frame portion, slots in each of the members that comprise the front frame portion and the rear frame portion, bolts extending through said slots, a threaded pintled caster extending through each of said bars and the elongated inverted channel iron adjacent to it, and two adjusting nuts on the threaded pintle of each of said casters.

FELIX L. HUNTER.

REFERENCES CITED

The following references are of record in the file of this patent:

UNITED STATES PATENTS

| Number | Name | Date |
|---|---|---|
| 211,828 | Ash | Feb. 4, 1879 |
| 1,304,677 | Gomez | May 27, 1919 |
| 1,595,007 | Kindrat | Aug. 3, 1926 |
| 1,743,904 | Russell | Jan. 14, 1930 |
| 2,219,609 | Askeris | Oct. 29, 1940 |